(12) United States Patent
Chen et al.

(10) Patent No.: US 7,345,959 B2
(45) Date of Patent: Mar. 18, 2008

(54) METHOD OF DATA STORAGE IN OPTICAL STORAGE MEDIA UNDER MULTIPLE SPECIFICATIONS

(75) Inventors: Yi-Yu Chen, Hsinchu (TW); Chien-Chung Lee, Hsinchu (TW)

(73) Assignee: Lite-on It Corporation, Taipei (TW)

( * ) Notice: Subject to any disclaimer, the term of this patent is extended or adjusted under 35 U.S.C. 154(b) by 655 days.

(21) Appl. No.: 11/033,680

(22) Filed: Jan. 12, 2005

(65) Prior Publication Data

US 2005/0152257 A1 Jul. 14, 2005

(30) Foreign Application Priority Data

Jan. 12, 2004 (TW) .............................. 93100645 A (51) Int. Cl.
*G11B 21/08* (2006.01)
(52) U.S. Cl. .................. 369/30.04; 369/59.25
(58) Field of Classification Search ..................... None
See application file for complete search history.

(56) References Cited

U.S. PATENT DOCUMENTS 5,321,673 A * 6/1994 Okazaki ................... 369/13.35
6,674,699 B2 * 1/2004 Winter .................... 369/47.15

* cited by examiner

*Primary Examiner*—Paul W. Huber
(74) *Attorney, Agent, or Firm*—Thomas, Kayden, Horstemeyer & Risley (57) ABSTRACT

A method of data storage in an optical storage media under multiple specifications. When a data is provided to store in a data area of the optical storage media under Mount Rainier (M3) specification, a first index of the data area under M3 specification is stored into a first data index area, i.e. an area of M3 file allocation table, of the optical storage media. Further, a conversion of the logical address of the data area from M3 specification to Method Two (M2) specification is proceeded, and a second index of the data area under M2 specification can be obtained and stored into a second data index area, i.e. an area of M2 file allocation table, which is in a general application area (GAA) under M3 specification, of the optical storage media.

14 Claims, 11 Drawing Sheets

METHOD OF DATA STORAGE IN OPTICAL STORAGE MEDIA UNDER MULTIPLE SPECIFICATIONS

BACKGROUND

The present invention relates to a method of data storage in an optical storage media under multiple specifications, and particularly to a method of data storage in an optical storage media under Mount Rainier (M3) specification, in which the data can be directly readable with an optical data retrieval system under Method Two (M2) specification.

Optical storage media, i.e. optical disks, are the prevailing trend of the storage media in computer technology. A variety of data storage specifications of the storage media are established and put in use in the data storing firmware and software, such as the optical disk drivers. For example, Method Two (M2) specification is the fundamental specification used in optical storage media in the past decade. Recently, Mount Rainier (M3) specification is widely used.

In order to retrieve data on the optical disks on a computer with an optical drive, the user has to install the optical disk driver for the optical drive. Since the optical disk driver includes the programs related to a data storage specification, the optical disks in which data is stored under the data storage specification can be recognized. Specifically, an optical disk in which data is stored under M2 specification can be retrieved in the computer with the optical disk driver compatible to M2 specification, and an optical disk in which data is stored under M3 specification can be retrieved in the computer with the optical disk driver compatible to M3 specification.

Presently, almost all operating systems available in the market support M2 specification. However, some earlier versions of the operating systems, such as MicroSoft Windows™ 95 and 98 operating systems, do not support M3 specification. Accordingly, these operating systems do not correctly retrieve data stored under M3 specification in an optical disk.

Figure 1A:
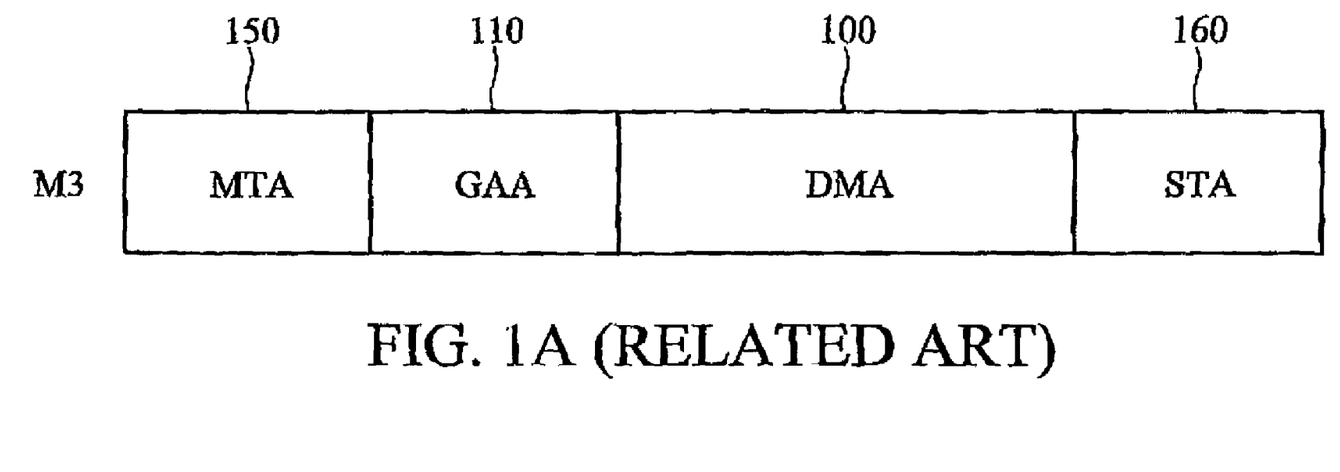
FIG. 1A is a schematic view of a physical block in an optical disk under Mount Rainier (M3) specification.

FIG. 1A shows a physical block diagram of an optical disk under Mount Rainier (M1) specification. The is physical blocks include a main table area (MTA) 150, a general application area (GAA) 110, a defect managed area (DMA) 100, and a secondary table area (STA) 160. MTA 150 is a lead-in area not directly retrievable under M2 or M3 specifications. GAA 110, DMA 100 and STA 160 constitute a user data area (UDA) directly retrievable under M2 and M3 specifications. Detail of the areas is described hereinafter.

The lead-in area of MTA 150 is a reserved area for remark of the format and the data structure of the optical disk. In MTA 150, a main defect table (MDT) is stored as a reference for the defect replacement system, which is employed in M3 specification. STA 160 is a backup area of MTA 150 in UDA, and a secondary defect table (SDT) is stored as a backup table of MDT in STA 160. Thus, it is possible for the systems not under M3 specification to retrieve data of the defect replacement system from SDT.

GAA 110 is a reserved area with 1024 sectors, in which data corresponding to the specification is stored. DMA 100 is a data area readable and writable for the user.

In the above-mentioned areas, sectors in GAA 110 and DMA 100 are defined as logical blocks in the widely used specifications. The logical block of GAA 110 and DMA 100 defined under M3 specification and the related logical block under M2 specification are hereinafter described with reference to FIG. 1B, FIG. 1C and FIG. 1D.

Figure 1B:
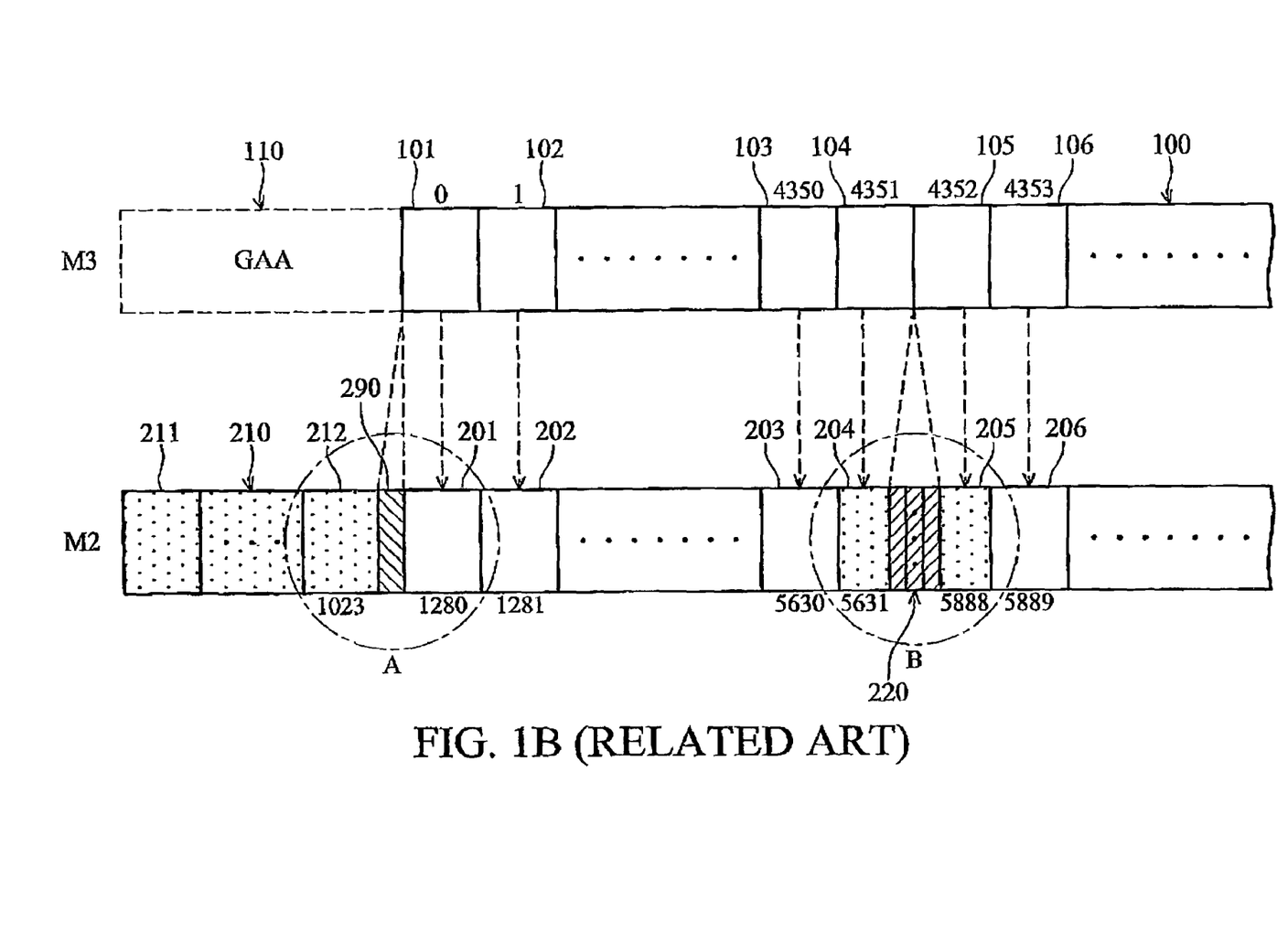
FIG. 1B is a schematic view showing relationship of logical address of data under M3 specification and M2 specification.

In FIG. 1B, the upper block shows the logical block of GAA 110 and DMA 100 under M3 specification, and the is lower block shows the corresponding logical block under M2 specification. Each of the blocks in FIG. 1B refers to a data storage unit, i.e. a sector, on the optical disk.

According to FIG. 1B, GAA 110 is not directly retrievable under M3 specification and is illustrated as a dotted block. However, the corresponding area 210 of GAA 110 under M2 specification is retrievable and has 1024 sectors, which includes the first sector 211 of M2 logical address 0 and the last sector 212 of M2 logical address 1023.

Further, DMA 100 under M3 specification is logically defined from the sector 101 as M3 logical address 0. Sequentially, the succeeding sector 102 is defined as M3 logical address 1.

It should be noted that the logical address under M2 specification is not in a one-by-one correspondence to the logical address under M3 specification. In the block A of FIG. 1B, for example, GAA 110 under M3 specification corresponds to the area 210 under M2 specification, in which the last sector has M2 logical address 1023. However, the succeeding sector 101 defined under M3 specification (M3 logical address 0) does not correspond to the succeeding sector of M2 logical address 1024 under M2 specification. Instead, the sector 101 corresponds to a sector 201 of M2 logical address 1280 under M2 specification.

Figure 1C:
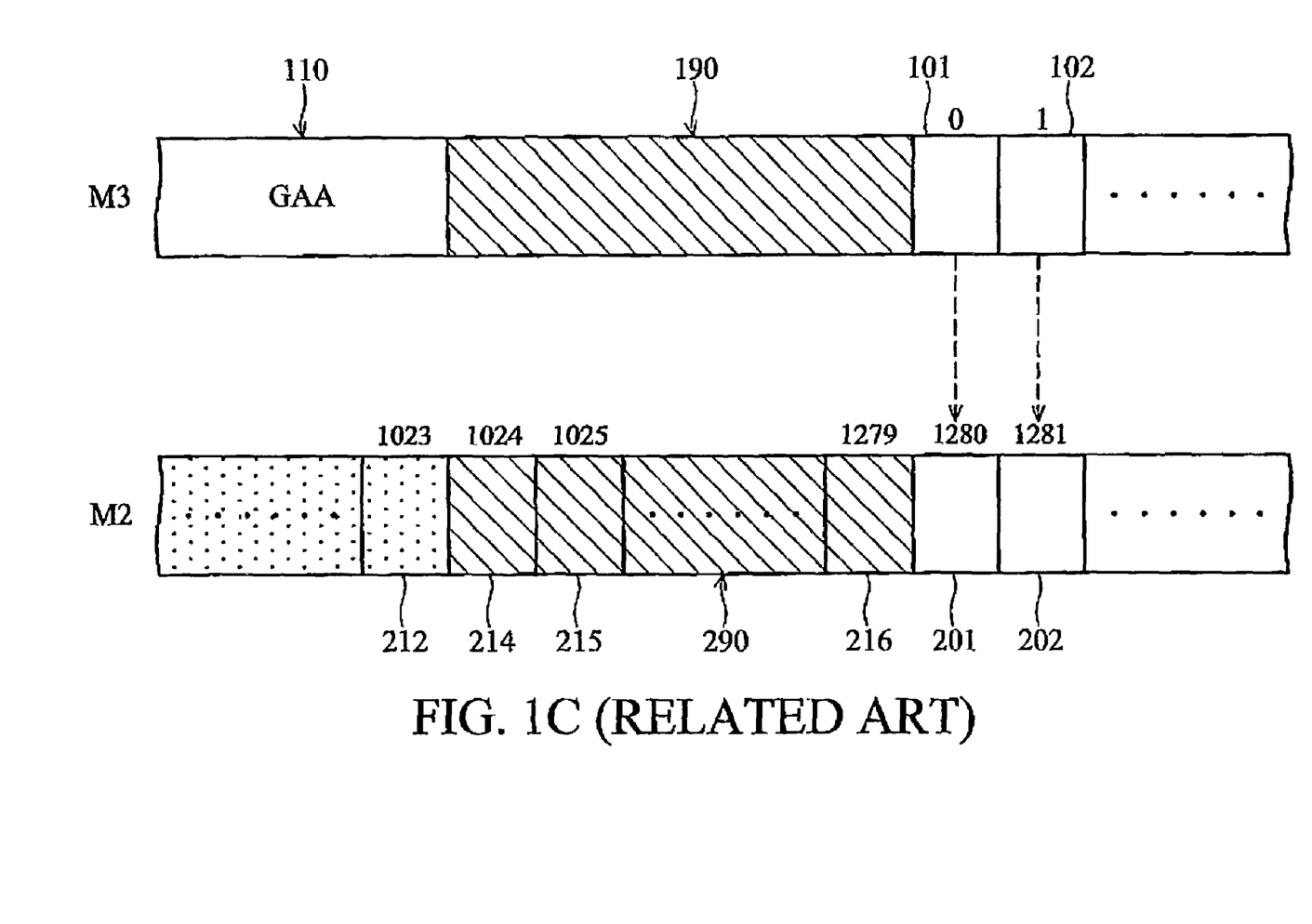
FIG. 1C is a detailed schematic view of the block A under M2 specification in FIG. 1B.

The block A is further illustrated in detail with reference to FIG. 1C. A spare area (SA) 190, which is logically undefined under M3 specification, exists between GAA 110 and DMA 100 under M3 specification. The spare area 190 corresponds to the logical block 290 under M2 specification, which has 258 sectors, including the sectors of M2 logical address 1024 to 1279. Specifically, GAA 110 and DMA 100 under M3 specification are logically contiguous, but the corresponding GAA 210 and DMA 200 under M2 specification are logically separated by the 256-sector spare area 290.

Further referring to FIG. 1B, in DMA 100 under M3 specification, a 4352-sector data area (DA), which includes the sector 101 of M3 logical address 0 to the sector 104 of M3 logical address 4351, is in a one-by-one correspondence to the data area under M2 specification, which includes the sector 201 of M2 logical address 1280 to the sector 204 of M2 logical address 5631. However, the succeeding sector 105 defined under M3 specification (M3 logical address 4352) does not correspond to the succeeding sector of M2 logical address 5632 under M2 specification. Instead, the sector 105 corresponds to a sector 205 of M2 logical address 5888 under M2 specification, which is shown in a block B.

The block B is further illustrated in detail with reference to FIG. 1D. A spare area 120, which is logically undefined under M3 specification, exists between the sectors 104 and 105 under M3 specification. The spare area 120 corresponds to the logical block 220 under M2 specification, which has 256 sectors, including the sector 221 of M2 logical address 5632 to the sector 224 of M2 logical address 5887. Specifically, DMA 100 under M3 specification is a logically contiguous area, but the corresponding DMA 200 under M2 specification includes a plurality of interlaced data areas and spare areas, such as the 256-sector spare area 220.

As mentioned above, DMA 100 under M3 specification constitutes logically-defined data areas and logically-undefined spare areas. The spare areas are reserved as substitute sectors of the defect replacement system in M3 specification. Detail of the defect replacement system is described with reference to FIG. 1E.

Figure 1D:
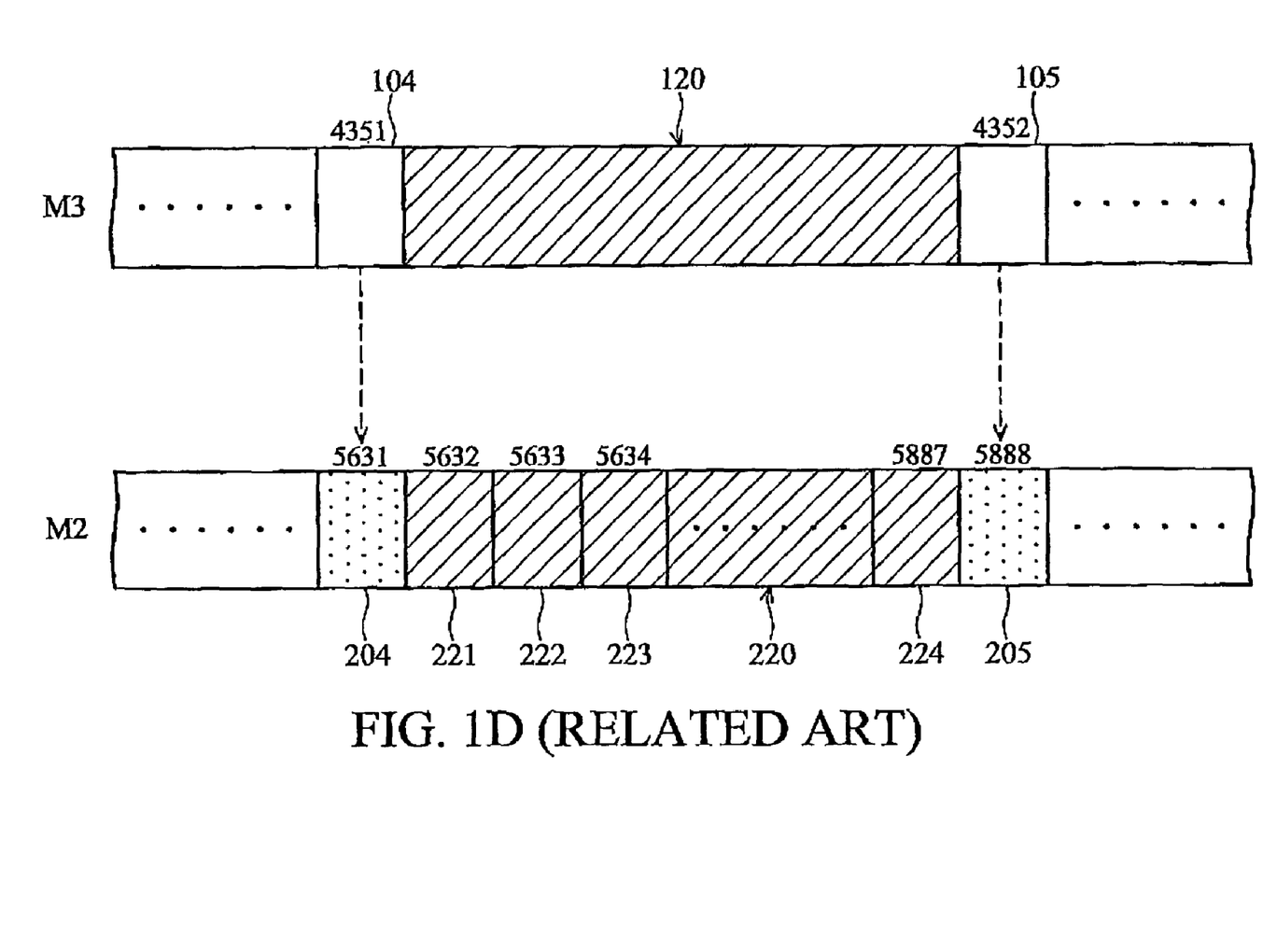
FIG. 1D is a detailed schematic view of the block B under M2 specification in FIG. 1B.
Figure 1E:
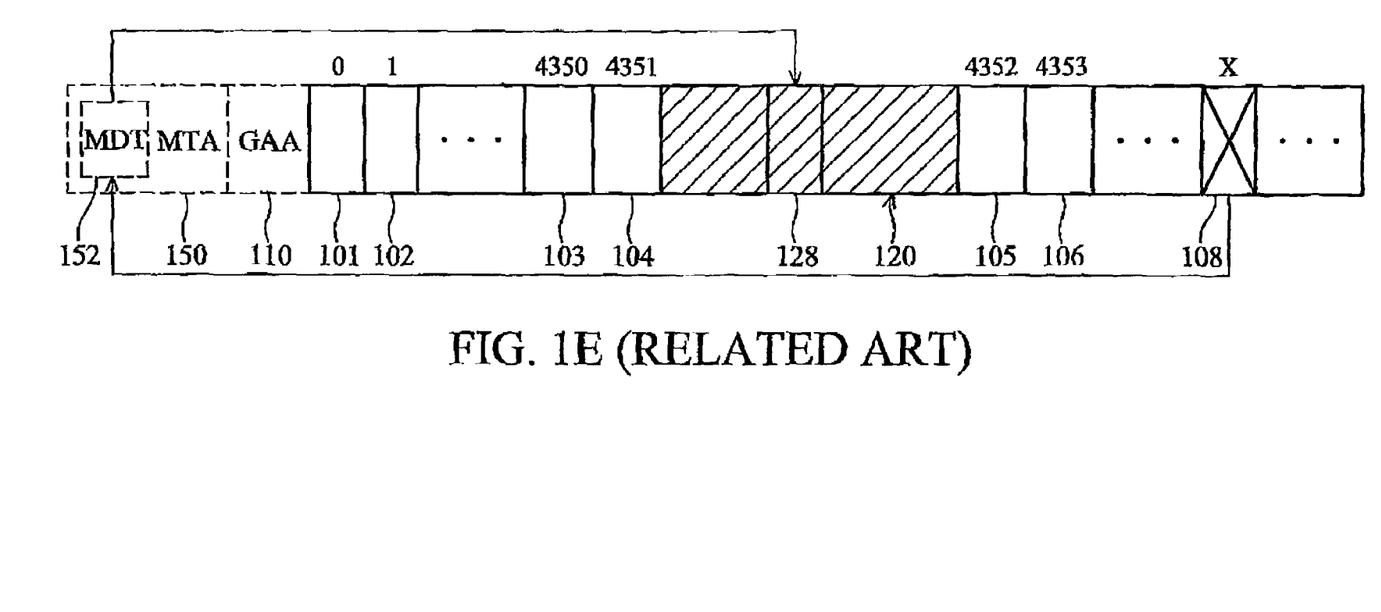
FIG. 1E is a schematic view of the defected control system under M3 specification.

In FIG. 1E, the defect replacement system in M3 specification utilizes the main defect table (MDT) 152 in MTA 150. MDT 152 denotes defect sectors in the data area. When a data is written to a sector on the optical disk under M3 specification, MDT 152 verifies the sector. If the sector is defected, a defect spare sector in the spare area is obtained corresponding to the sector, and the data is written to the defect spare sector. Specifically, FIG. 1E shows a defect sector 108, which is defected, of M3 logical address x, and a defect spare sector 128 in the spare area 120 serves as the actual sector of M3 logical address x. In data retrieval under M3 specification, the system checks if the data area to be read includes M3 logical address x, which refers to the defect sector 108, from MDT 152. If the defect sector 108 is included in the data area, the system retrieves data of M3 logical address x directly from the defect spare sector 128.

It is mentioned above that, when an operating system supports M2 specification but does not support M3 specification, the operating system does not correctly retrieve data stored under M3 specification in an optical disk. An example of the problem is described with reference to FIG. 2A and FIG. 2E.

Figure 2A:
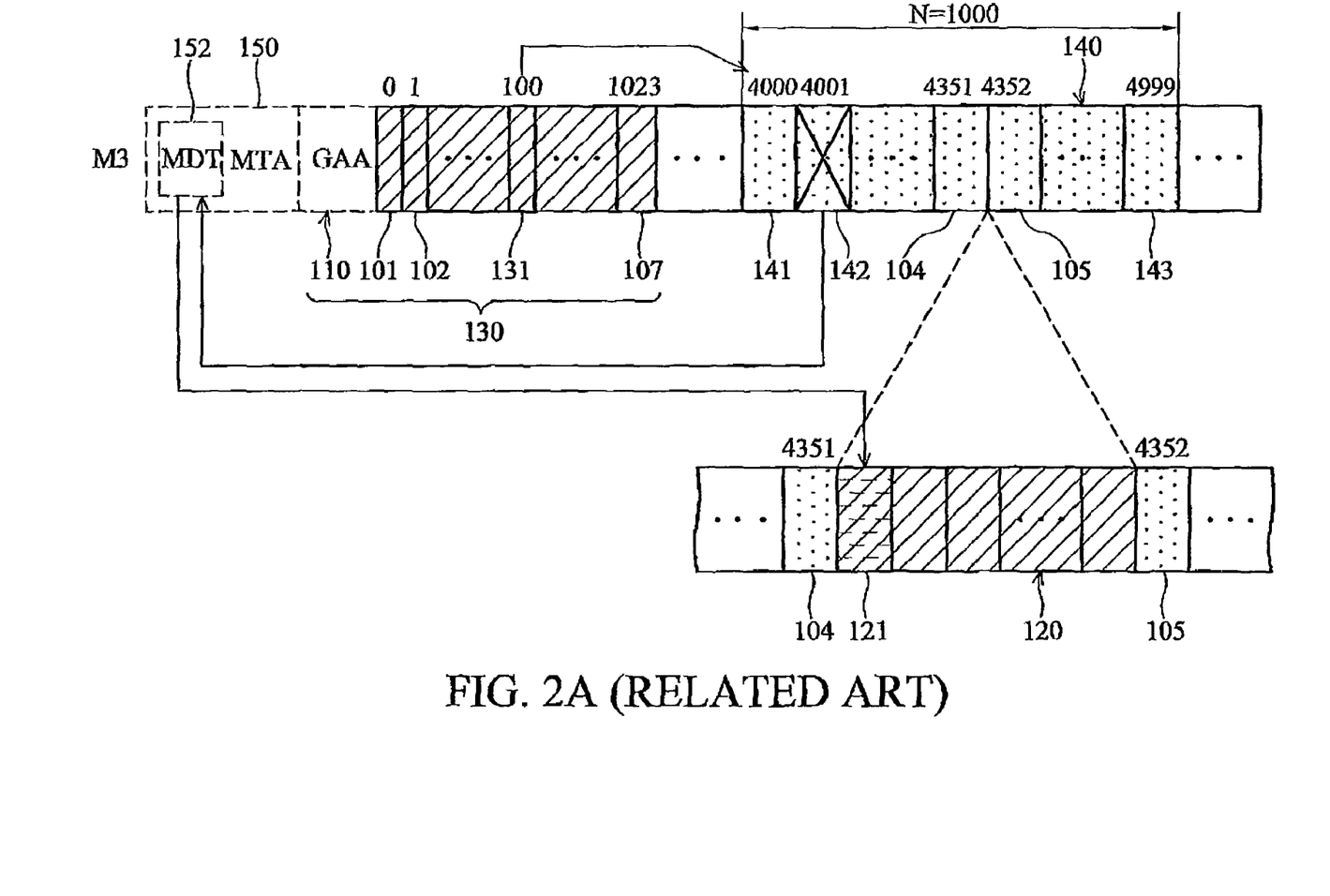
FIG. 2A is a schematic view showing formation of a conventional data storage under M3 specification.
Figure 2B:
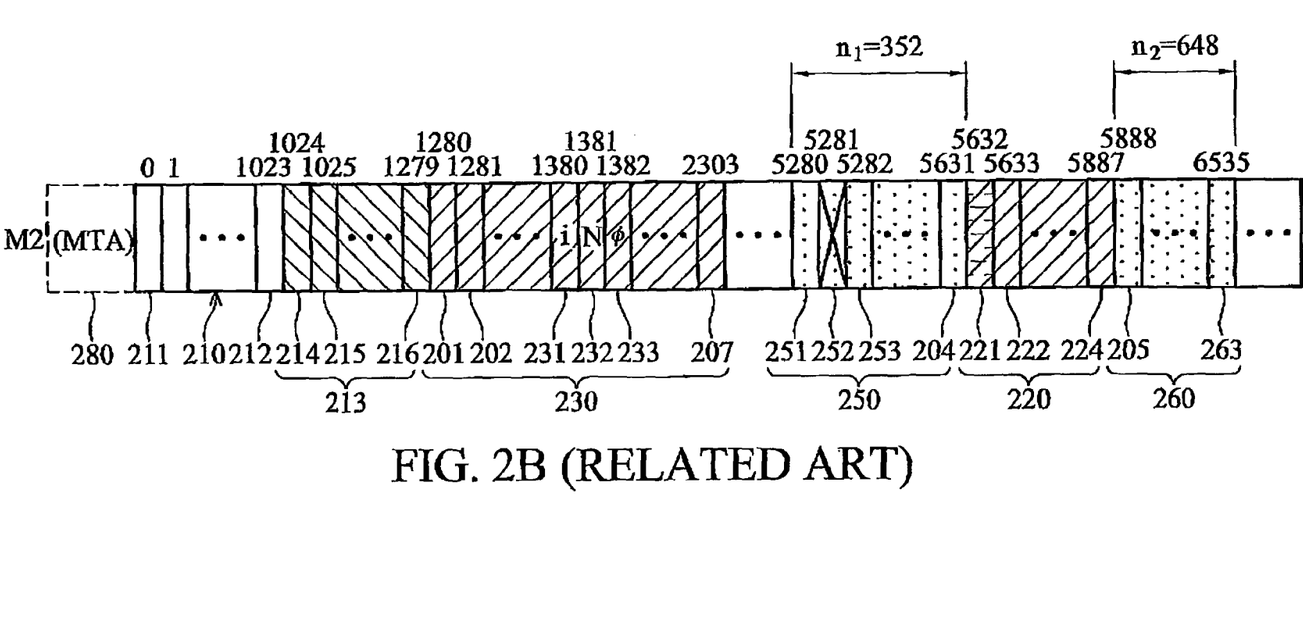
FIG. 2B is a schematic view showing retrieval of the formation of the data storage of FIG. 2A under M2 specification.

FIG. 2A shows formation of conventional data storage in an optical disk under M3 specification. Generally, a plurality of sectors, i.e. 1024 sectors, of the data area is reserved as a data indication area, such as a file allocation table (FAT) area. In FIG. 2A, the data indication area includes sectors of M3 logical address 0 to 1023.

A plurality of data, i.e. a file, is stored in the data area 140 in FIG. 2A, which includes sectors of M3 logical address 4000 to 4999. The data length of the file is N=1000 sectors, and the file original sector 141 of the file is a sector of M3 logical address i=4000. Further, the sector 142 of M3 logical address 4001 in the data area 140 is a defect sector, and a defect spare sector 121 is denoted in MDT 152 as the corresponding sector of the defect sector 142.

Further, a set of M3 pointers 131 to 133 related to the data area 140 is stored in the data indication area (FAT) 130. The M3 pointers are stored in the sectors of M3 logical address 100 to 102, in which the sector 130 stores the M3 logical address i=4000 of the file original sector 141, the sector 132 stores the data length N=1000, and the sector 133 stores an ending signal ø, indicating the end of the pointers.

Further, a defect sector 142 of M3 logical address 4001 exists in the data area 140, and a defect spare sector 121 corresponds to the defect sector 142. There is no pointer indicating the defect spare sector 121 in the data indication area 130, since the defect spare sector 121 serves as the sector of M3 logical address 4001.

When an operating system that only supports M2 specification is provided, the retrieval of the data in FIG. 2A is shown in FIG. 2B.

FIG. 2B is a schematic view showing retrieval of the formation of data storage of FIG. 2A under M2 specification. In FIG. 2B, the data indication area (FAT) under M2 specification includes sectors of M2 logical address 0 to 1023, which correspond to the sectors of the area 210 of GAA 110 under M3 specification. Further, the sectors as the data indication area (FAT) 130 under M3 specification correspond to the sectors 230 of M2 logical address 1280 to 2303. The sectors 230 are recognized as a portion of the data area under M2 specification and do not perform in data indication.

Further, the spare area 120, which is logically-undefined under M3 specification, corresponds to the logical block 220, which has 256 sectors including sectors of M2 logical address 5632 to 5887 as shown in FIG. 2B and FIG. 1D.

Thus, the data area 140, which includes sectors of successive M3 logical address under M3 specification, is divided by the logical block 220 into two separate data areas, i.e. the M2 first data area 250 and the M2 second data area 260, under M2 specification. The M2 logical address of the data original sector 251 of the M2 first data area 250 is 5280, and the data length of the M2 first data area 250 is n1=352 sectors. The M2 logical address of the data original sector 205 of the M2 second data area 260 is 5888, and the data length of the M2 second data area 260 is n2=648 sectors.

Further, in FIG. 2B, the defect sector 252 of M2 logical address 5281, which corresponds to the defect sector 142 of M3 logical address 4001, does not store any data therein. Instead, the data is stored in another sector 221 of M2 logical address 5632, which corresponds to the defect spare sector 121 under M3 specification. Under M2 specification, however, there is no defect replacement system, and the area 280 corresponding to MTA 150 under M3 specification is not retrievable. STA 160, which is the backup area of MTA 150 in UDA, is retrievable under M2 specification but is regarded as data area. Thus, the secondary defect table (SDT) stored in STA 160 is not recognized to perform defect replacement under M2 specification.

Accordingly, when an optical disk in which data is stored under M3 specification is provided for a computer with an operating system supporting M2 specification only, the computer does not correctly retrieve data in the optical disk. The reasons of the incorrect retrieval are hereinafter described.

One of the reasons relates to data indication. Under M2 specification, the sectors 230, which correspond to the sectors as the data indication area (FAT) 120 and stores the pointers under M3 specification, are recognized as data area. Further, there is no pointer stored in the data indication area 210 under M2 specification. As a result, with the computer supporting M2 specification only, no index for the data area can be obtained.

The problem of data indication can be solved with a conversion of logical address between M2 and M3 specifications can be employed to obtain the index. There is, however, a further problem regarding the defect replacement system. In the defect replacement system of M3 specification, MDT 152 stored in MTA 150 is utilized as the reference for the defect replacement system and denotes defect sectors in the data area. Under M2 specification, however, the area 280 corresponding to MTA 150 under M2 specification is not retrievable. As a result, the defect sectors in the data area are not recognized under M2 specification even if a conversion of logical address between M2 and M3 specifications is employed to obtain the index for the data area. Further, the defect spare sectors can not be obtained since no defect sectors are recognized.

Accordingly, in a computer with an operating system supporting M2 specification only, a software or hardware supporting M3 specification is required for retrieval of the optical disk in which data is stored under M3 specification. A conversion program or an additional optical drive, for example, can be employed to translate the formation of the data storage under M3 specification shown in FIG. 2A to the formation of the data storage under M2 specification as shown in FIG. 2B. This, however, further increases cost and resource loading of the computer.

SUMMARY

Accordingly, the present invention provides a method of data storage in an optical storage media under multiple specifications. When a data is provided to store in a data area of the optical storage media under a first specification, a first index of the data area under the first specification is stored into a first data index area of the optical storage media. Further, a conversion of the logical address of the data area from the first specification to the second specification is proceeded, and a second index of the data area under the second specification can be obtained and stored into a second data index area, which is related to a logically-undefined area of the optical storage media under the first specification.

Specifically, in the method of data storage, when a data is provided to store in a data area of the optical storage media under Mount Rainier (M3) specification, a first index of the data area under M3 specification is stored into a first data index area, i.e. an area of M3 file allocation table, of the optical storage media. Further, a conversion of the logical address of the data area from M3 specification to Method Two (M2) specification is proceeded, and a second index of the data area under M2 specification can be obtained and stored into a second data index area, i.e. an area of M2 file allocation table, which is in a general application area (GAA) under M3 specification, of the optical storage media.

In the method of the present invention, the first index and the second index can respectively comprise an initial address index and a data length index. Further, the optical storage media includes a Compact Disk-Recordable and Writable (CD-RW) or a Digital Video Disk-Recordable and Writable (DVD-RW).

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION

The present invention relates to a method of data storage in an optical storage media under multiple specifications. When a data is provided to store in a data area of the optical storage media under Mount Rainier (M3) specification, a first index of the data area under M3 specification is stored into a first data index area, i.e. an area of M3 file allocation table, of the optical storage media. Further, a conversion of the logical address of the data area from M3 specification to Method Two (M2) specification is proceeded, and a second index of the data area under M2 specification can be obtained and stored into a second data index area, i.e. an area of M2 file allocation table, which is in a general application area (GAA) under M3 specification, of the optical storage media.

The method of the present invention is hereinafter described in detail with reference to FIG. 3A, FIG. 3B and FIG. 4.

First Embodiment

Figure 3A:
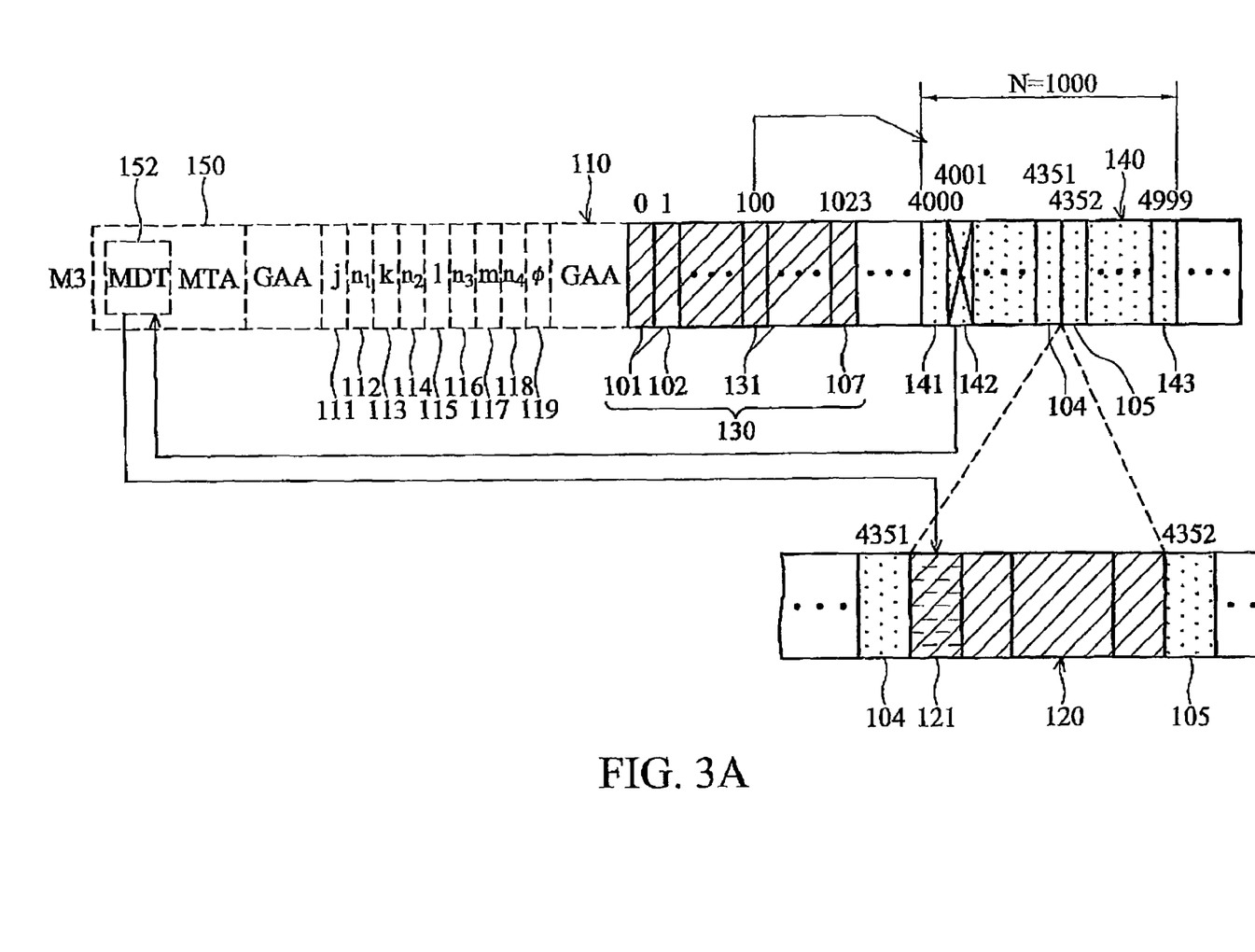
FIG. 3A is a schematic view showing formation of a data storage under M3 specification in a first embodiment.
Figure 3B:
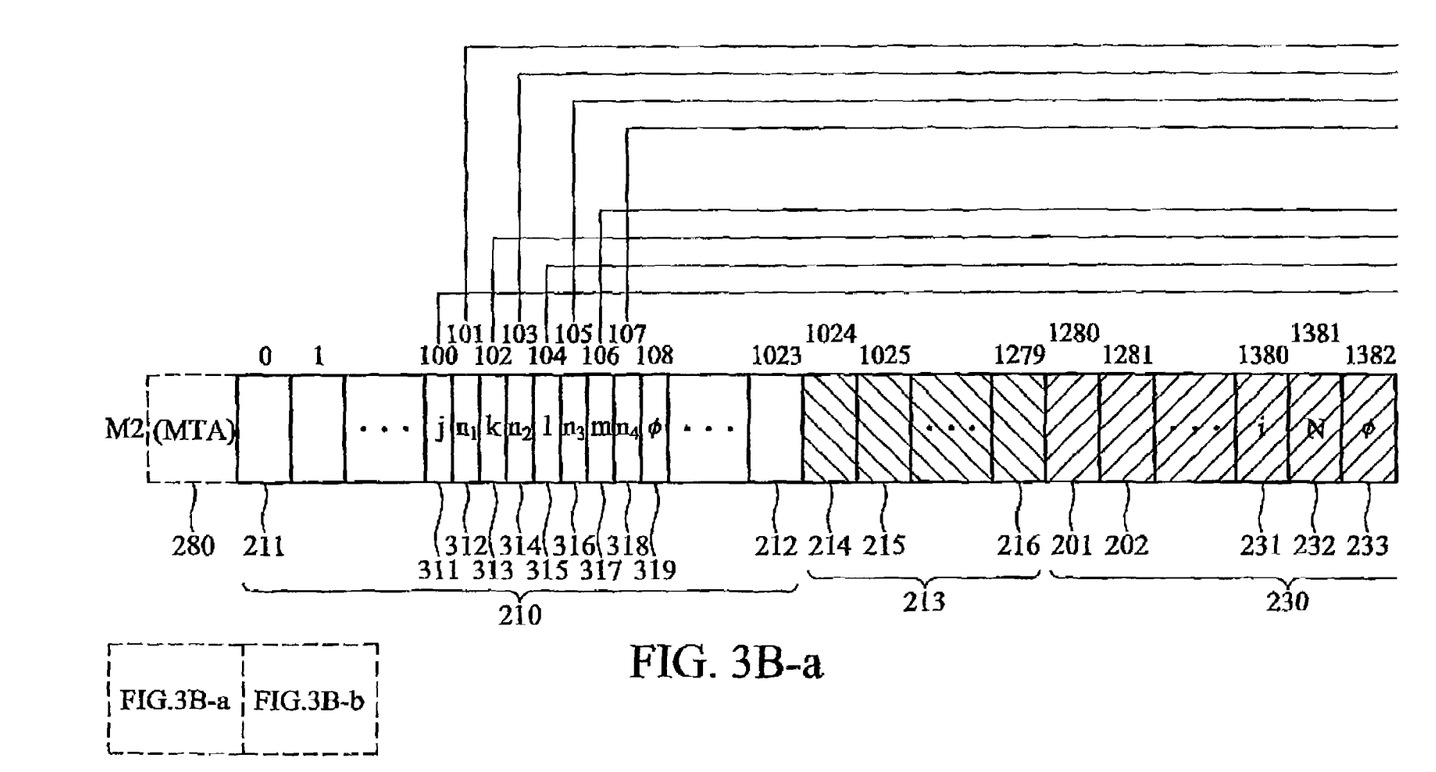
FIG. 3B is a schematic view showing conversion of the formation of the data storage of FIG. 3A under M2 specification.

FIGS. 3A and 3B show a first embodiment of the method of data storage in an optical storage media under multiple specifications. The optical storage media in FIGS. 3A and 3B can be a Compact Disk-Recordable and Writable (CD-RW).

FIG. 3A shows formation of a data storage under M3 specification of the first embodiment. Generally, a plurality of sectors, i.e. 1024 sectors, of the data area is reserved as a data indication area, such as a file allocation table (FAT) area. The data indication area 130 under M3 specification includes sectors of M3 logical address 0 to 1023 as shown in FIG. 3A, and the data indication area under M2 specification corresponds to GAA 110 under M3 specification.

When a plurality of data, i.e. a file, is stored in the data area 140 in FIG. 3A, the sector 142 of M3 logical address 4001 in the data area 140 is a defect sector, and the defect spare sector 121 is denoted in MDT 152 as the corresponding sector of the defect sector 142, a set of M3 pointers 131 to 133 (a first index) related to the data area 140 is stored in a first data indication area (an area of M3 FAT) 130.

Further, a set of M2 pointers (a second index) related to the data area 140 is stored in a second data index area (an area of M2 FAT), which corresponds to GAA 110 under M3 specification. Practically, a conversion of the logical address of the data area 140 from M3 specification to M2 specification is proceeded to obtain the M2 pointers.

FIG. 3B shows the conversion of the formation of data storage in FIG. 3A. In FIG. 3B, the data area 140, which includes sectors of successive M3 logical address under M3 specification, is divided by the logical block 220 into two separate data areas, i.e. the M2 first data area 250 and the M2 second data area 260, under M2 specification. The M2 logical address of the data original sector 251 of the M2 first data area 250 is 5280, and the data length of the M2 first data area 250 is n1=352 sectors. The M2 logical address of the data original sector 205 of the M2 second data area 260 is 5888, and the data length of the M2 second data area 260 is n2=648 sectors. Further, the defect sector 252 of M2 logical address 5281, which corresponds to the defect sector 142 of M3 logical address 4001, does not store any data therein. Instead, the data is stored in another sector 221 of M2 logical address 5632, which corresponds to the defect spare sector 121 under M3 specification. As a result, the actual data area under M2 specification can be obtained in a form of an initial address index and a data length index according to the M2 logical address as four separated areas, including:

1. the first area in which the M2 logical address of the data original sector 251 thereof is j=5280 and the data length thereof is n1=1 sector;

2. the second area in which the M2 logical address of the data original sector 221 thereof is k=5632 and the data length thereof is n2=1 sector;
3. the third area in which the M2 logical address of the data original sector 253 thereof is j=5282 and the data length thereof is n3=350 sectors; and
4. the fourth area in which the M2 logical address of the data original sector 205 thereof is j=5888 and the data length thereof is n4=648 sectors.

Thus, the data area 140 is converted to the four separated data areas under M2 specification, and the M2 logical address of the data original sectors and the data length of the separated data areas under M2 specification as mentioned above can be utilized as the M2 pointers (the second index). The M2 pointers can be stored in the sectors 111 to 119 in GAA 110, which corresponds to the data indication area 210.

As a result, when the data storage is provided in a computer with an operating system that only supports M2 specification, the computer recognizes the above-mentioned separated data areas under M2 specification from the sectors 311 to 319 of M2 logical address 100 to 108, which stores the M2 pointers, in the data indication area 210. Thus, the separated data areas under M2 specification can be retrieved correctly.

It should be mentioned that, since there is no defect replacement system under M2 specification, the M2 pointers can be obtained and stored in GAA 110 according to data in MDT 152 in the conversion so that the defect spare area, such as the sector 221 in FIG. 1E, can be recognized correctly under M2 specification. Thus, no additional software or hardware supporting M3 specification is required.

Further, optical storage media such as CD-RWs, which support M3 specification, generally do not provide functions to store or retrieve data from GAA 110. As a result, a specific data writing program can be employed to store the data of the M2 pointers in GAA 110 by a manufacturer so that the M2 pointers are stored in GAA 110. In data retrieval of the optical storage media, no additional software or hardware supporting M3 specification is required.

The first index (the M3 pointers) and the second index (the M2 pointers) employed in the first embodiment comprise the initial address index and the data length index. However, other index structure can be employed.

Further, the optical storage media can be a Compact Disk-Recordable and Writable (CD-RW). It is also applicable that the optical storage media is a Digital Video Disk-Recordable and Writable (DVD-RW).

Second Embodiment

In the first embodiment, a plurality of data is utilized as an example for description of the data storage. Data storage of an optical storage media, however, is generally performed by a single writing procedure for all the data to be stored therein. FIG. 4 shows another formation of a data storage in a second embodiment, in which data is stored in the optical storage media by the single writing procedure.

Figure 4:
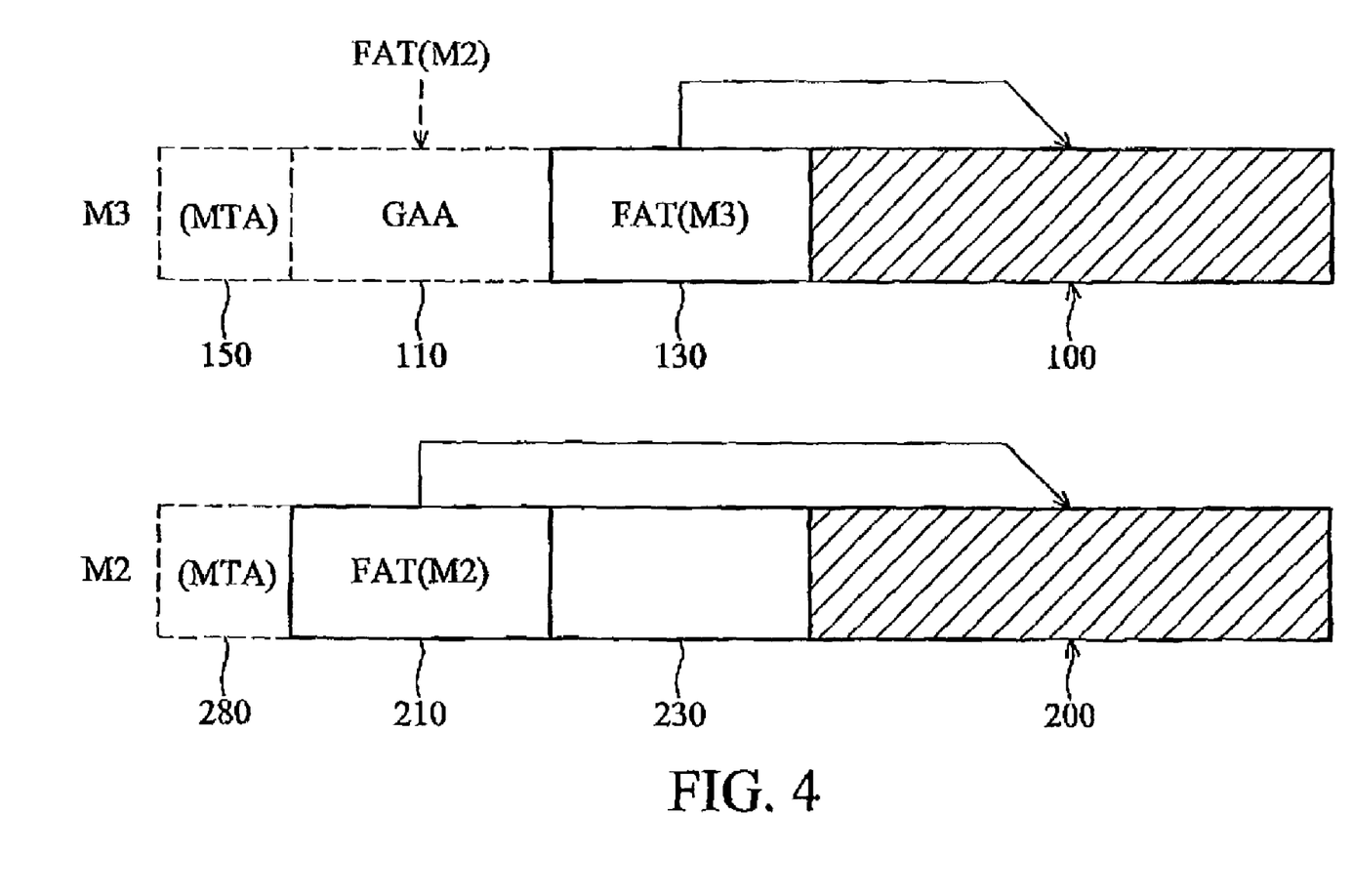
FIG. 4 is a schematic view showing formation of a data storage in a second embodiment.

According to FIG. 4, when data is stored under M3 specification, the data is stored in the data area in DMA 100 under M3 specification. If defect sectors exist in the data area, the data to be stored in the defect sectors is stored in corresponding defect spare sectors according to the defect replacement system of M3 specification. Further, an area is reserved in the initial area of the DMA 100 as an M3 FAT area 130 (the first data indication area), and the M3 FAT is stored in the M3 PAT area 130. Since GAA 110 under M3 specification corresponds to the M2 FAT area 210 (the second data indication area), an M2 FAT in the form of M2 logical address is obtained by conversion of the M3 FAT, and is stored in GAA 110.

When the data storage is provided in a computer with an operating system that supports M3 specification, the computer retrieves the M3 FAT from the M3 FAT area 130.

When the data storage is provided in a computer with an operating system that supports M2 specification only, the computer retrieves the M2 FAT from the M2 FAT area 120. Thus, the data storage can be retrieved correctly under either M3 specification or M2 specification without any additional software or hardware.

It should be mentioned that, in the above-mentioned embodiments, M2 specification and M3 specification are disclosed as the example of multiple specifications. However, the method of the present invention can be employed in an optical storage media under multiple specifications. The multiple specifications can be a first specification and a second specification, in which a first initial logical sector defined under the second specification is physically different from a second initial logical sector defined under the first specification, and the second data index area is in a logically-undefined area under the first specification.

With the present invention, a method of data storage in an optical storage media under multiple specifications is obtained. Any operating systems supporting either M3 specification or M2 specification can correctly retrieve data stored in an optical disk with the method of the present invention. Compatibility of the optical disks is thus greatly improved.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of data storage in an optical storage media under multiple specifications, comprising the steps of:
   providing a data and store the data in a data area of the optical storage media under a first specification;
   storing a first index of the data area under the first specification into a first data index area of the optical storage media; and
   storing a second index of the data area under a second specification into a second data index area of the optical storage media;
   wherein a first initial logical sector defined under the second specification is physically different from a second initial logical sector defined under the first specification, and the second data index area is in a logically-undefined area under the first specification.

2. The method of data storage in an optical storage media under multiple specifications as claimed in claim 1, wherein the first specification is Mount Rainier (M3) specification.

3. The method of data storage in an optical storage media under multiple specifications as claimed in claim 1, wherein the second specification is Method Two (M2) specification.

4. The method of data storage in an optical storage media under multiple specifications as claimed in claim 1, wherein the optical storage media comprises a Compact Disk-Recordable and Writable (CD-RW).

5. The method of data storage in an optical storage media under multiple specifications as claimed in claim 1, wherein the optical storage media comprises a Digital Video Disk-Recordable and Writable (DVD-RW).

6. The method of data storage in an optical storage media under multiple specifications as claimed in claim 1, wherein the first index comprises an initial address index and a data length index.

7. The method of data storage in an optical storage media under multiple specifications as claimed in claim 1, wherein the second index comprises an initial address index and a data length index.

8. A method of data storage in an optical storage media under multiple specifications, comprising the steps of:
   providing a data and store the data in a data area of the optical storage media under Mount Rainier (M3) specification;
   storing a first index of the data area under M3 specification into a first data index area of the optical storage media; and
   storing a second index of the data area under Method Two (M2) specification into a second data index area of the optical storage media;
   wherein the second data index area is in a general application area (GAA) under M3 specification.

9. The method of data storage in an optical storage media under multiple specifications as claimed in claim 8, wherein the data area is in a defect managed area (DMA) under M3 specification.

10. The method of data storage in an optical storage media under multiple specifications as claimed in claim 8, wherein the first data index area comprises an M3 file allocation table (FAT), and the second data index area comprises an M2 file allocation table.

11. The method of data storage in an optical storage media under multiple specifications as claimed in claim 8, wherein the optical storage media comprises a Compact Disk-Recordable and Writable (CD-RW).

12. The method of data storage in an optical storage media under multiple specifications as claimed in claim 8, wherein the optical storage media comprises a Digital Video Disk-Recordable and Writable (DVD-RW).

13. The method of data storage in an optical storage media under multiple specifications as claimed in claim 8, wherein the first index comprises an initial address index and a data length index.

14. The method of data storage in an optical storage media under multiple specifications as claimed in claim 8, wherein the second index comprises an initial address index and a data length index.

* * * * *